(12) United States Patent
Sato

(10) Patent No.: US 6,414,715 B1
(45) Date of Patent: Jul. 2, 2002

(54) IMAGE VIBRATION COMPENSATING APPARATUS

(75) Inventor: Tsuguo Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/053,249

(22) Filed: Apr. 1, 1998

(30) Foreign Application Priority Data

Apr. 2, 1997 (JP) ............................................. 9-083875

(51) Int. Cl.[7] .............................................. H04N 5/228
(52) U.S. Cl. ....................................................... 348/208
(58) Field of Search ................................. 348/208, 207, 348/352; 396/55, 54, 53, 52

(56) References Cited

U.S. PATENT DOCUMENTS 5,867,213 A * 2/1999 Ouchi ......................... 348/208
5,923,368 A * 7/1999 Hirasawa .................... 348/208
5,982,421 A * 11/1999 Inou et al. ................... 348/208
6,014,169 A * 1/2000 Azusawa et al. ............ 348/208

* cited by examiner

Primary Examiner—Wendy R. Garber
Assistant Examiner—Aung S. Moe
(74) Attorney, Agent, or Firm—Bell Boyd & Lloyd LLC

(57) ABSTRACT

An image vibration compensating apparatus is provided for properly compensating image vibrations while suppressing unnatural image vibrations after completion of intentional panning and tilting. A-D conversion is performed on an output signal of an X-direction gyro sensor and low frequency components are removed from the signal. The signal is then integrated at an integrator to be angle signal Ex. A panning detector detects a start and a stop of intentional panning from angle signal Ex. A subtraction value generator generates a value for canceling angle signal Ex resulting from the intentional panning. An angle control signal computing section cancels angle signal Ex resulting from the intentional panning with the value and outputs angle control signal $V_{Xref}$. An image vibration in the direction of panning is compensated based on angle control signal $V_{Xref}$.

3 Claims, 6 Drawing Sheets

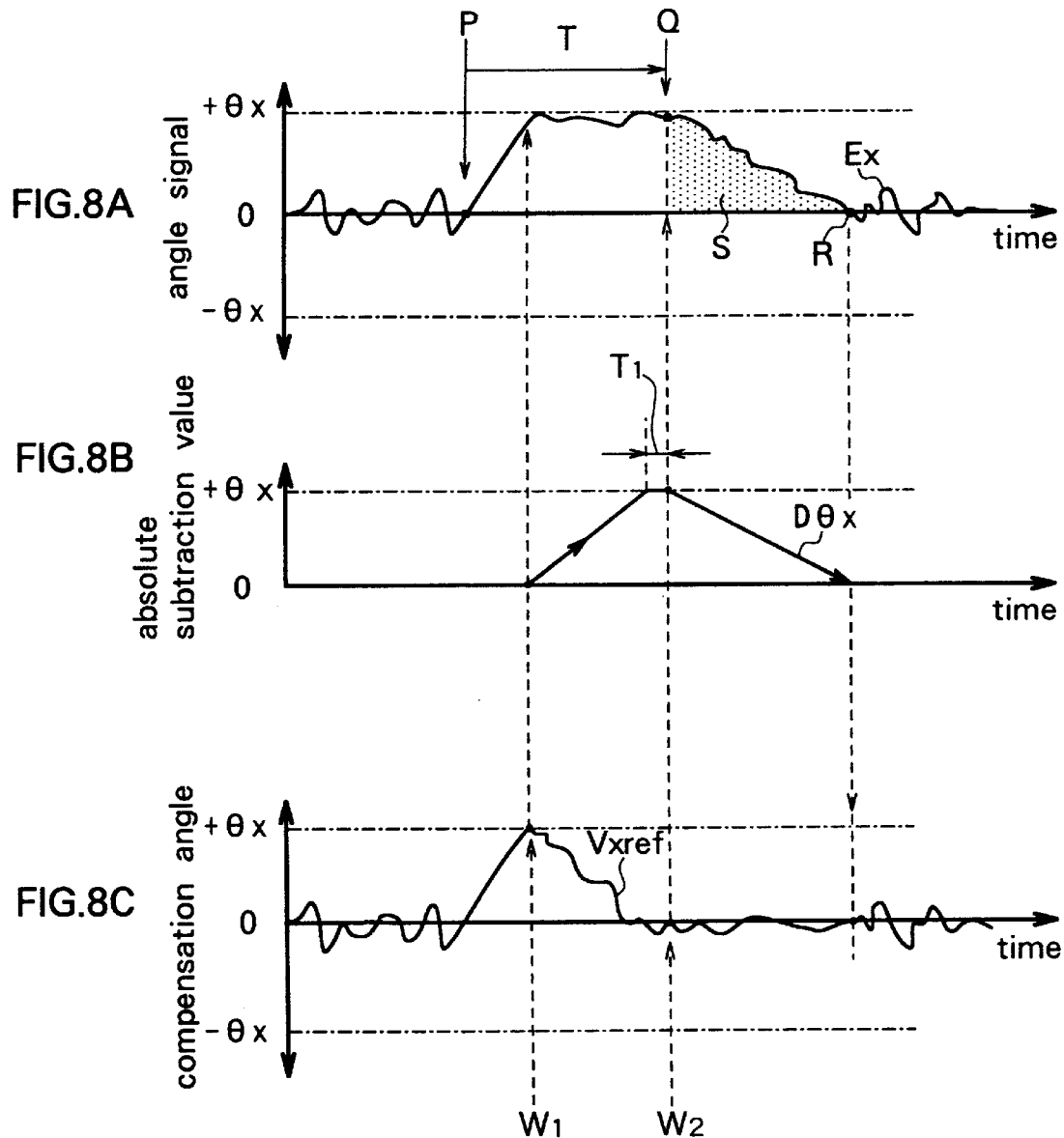

IMAGE VIBRATION COMPENSATING APPARATUS

BACKGROUND OF THE INVENTION

1. Field of the Invention

The present invention relates to an apparatus for compensating image vibrations of an image pickup apparatus such as a video camera.

2. Description of the Related Art

An apparatus for compensating image vibrations caused by vibrations such as tremors of the operator's hands has been practically utilized for an image pickup apparatus such as a video camera. One of compensation methods is achieved through providing an image pickup apparatus with a detection apparatus for detecting vibrations of the image pickup apparatus and an optical compensation system for changing an angle of deflection of the optical axis by changing the apex angle of a prism, for example. The optical compensation system is controlled by a servo circuit based on the output of the detection apparatus and the angle of deflection of the optical axis is thereby controlled. For example, an angular velocity sensor such as a gyro sensor is used for the detection apparatus for detecting vibrations of the image pickup apparatus in this method.

When vibrations are detected by the detection apparatus such as an angular velocity sensor as described above, signals outputted from the detection apparatus include signals resulting from intentional panning (turning a video camera and so on in the lateral direction) and tilting (turning a video camera and so on in the vertical direction) besides signals resulting from vibrations to be compensated such as those caused by tremors of the operator's hands. Consequently, compensation for image vibrations is performed until the angle of deflection of the optical axis reaches the limit of the compensation range in a short time after intentional panning or tilting is started. As a result, the angle of deflection of the optical axis is fixed to the limit of the compensation range. On completion of panning or tilting the angle of deflection of the optical axis is required to be returned to the neighborhood of the center of the compensation range and control is performed for this purpose. However, this returning motion results in unnatural image vibrations on completion of panning or tilting which gives the operator a feeling of unnaturalness.

In order to compensate image vibrations based on signals resulting from vibrations to be compensated only, filtering and so on may be performed for separating output signals of the detection apparatus into the signals resulting from the vibrations to be compensated and signals resulting from intentional panning or tilting. In general, however, frequencies of image vibrations range from 0.5 to 30 Hz. Signals resulting from intentional panning and tilting belong to this frequency band as well. It is therefore difficult to completely separate the signals resulting from the vibrations to be compensated and those resulting from intentional panning or tilting.

SUMMARY OF THE INVENTION

It is an object of the invention to provide an image vibration compensating apparatus for optimally compensating image vibrations while reducing unnatural image vibrations on completion of intentional panning and tilting.

An image vibration compensating apparatus comprises: a vibration detection means for detecting a vibration causing an image vibration and outputting an signal in accordance with the vibration; a panning and tilting detection means for detecting a start and a stop of intentional panning or tilting; a computing means for subtracting a value for canceling the output signal of the vibration detection means resulting from the intentional panning or tilting from the output signal of the vibration detection means during a period between detection of the start of the intentional panning or tilting and detection of the stop of the intentional panning or tilting by the panning and tilting detection means in a period at least including the instant of the stop of the intentional panning or tilting, for subtracting a value for canceling the output signal of the vibration detection means from the output signal of the vibration detection means in a period after the detection of the stop of the intentional panning or tilting by the panning and tilting detection means and for outputting the output signal of the vibration detection means intact in any other period; and a compensation means for compensating the image vibration based on the output signal of the computing means.

In the image vibration compensating apparatus the vibration detection means detects the vibration causing the image vibration and outputs the signal in response to the vibration. The panning and tilting detection means detects the start and stop of the intentional panning. During the period between detection of the start of the intentional panning or tilting and detection of the stop of the intentional panning or tilting by the panning and tilting detection means, the computing means subtracts the value for canceling the output signal of the vibration detection means resulting from the intentional panning or tilting from the output signal of the vibration detection means in the period at least including the instant of the stop of the intentional panning or tilting. The computing means subtracts the value for canceling the output signal of the vibration detection means from the output signal of the vibration detection means in the period after the detection of the stop of the intentional panning or tilting by the panning and tilting detection means. The computing means outputs the output signal of the vibration detection means intact in any other period. The compensation means compensates the image vibration based on the output signal of the computing means.

Other and further objects, features and advantages of the invention will appear more fully from the following description.

BRIEF DESCRIPTION OF THE DRAWINGS

FIG. 8A, FIG. 8B and FIG. 8C are plots for illustrating generation of angle control signals in the image vibration compensating apparatus of the embodiment of the invention.

DETAILED DESCRIPTION OF THE PREFERRED EMBODIMENT

A preferred embodiment of the invention will now be described in detail with reference to the accompanying drawings.

Figure 2:
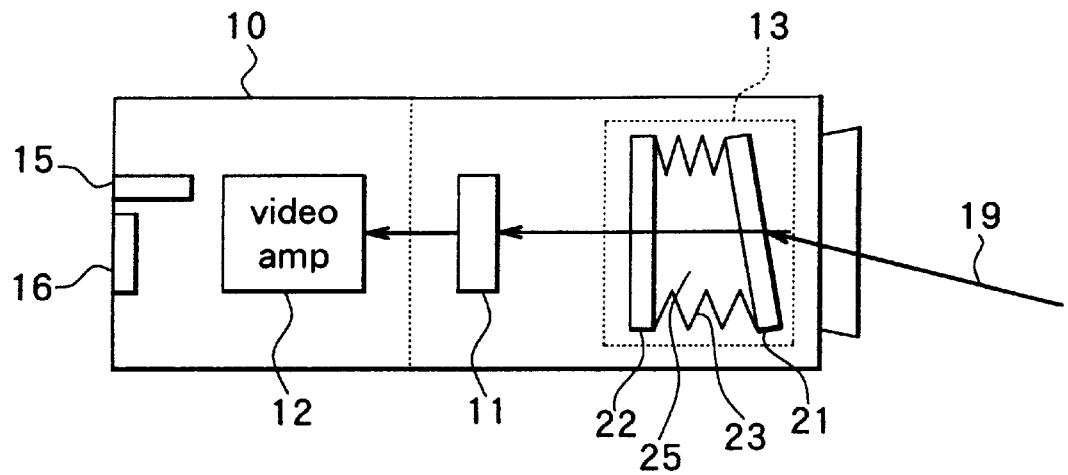
FIG. 2 is a schematic view for illustrating a video camera including the image vibration compensating apparatus of the embodiment of the invention.
Figure 3:
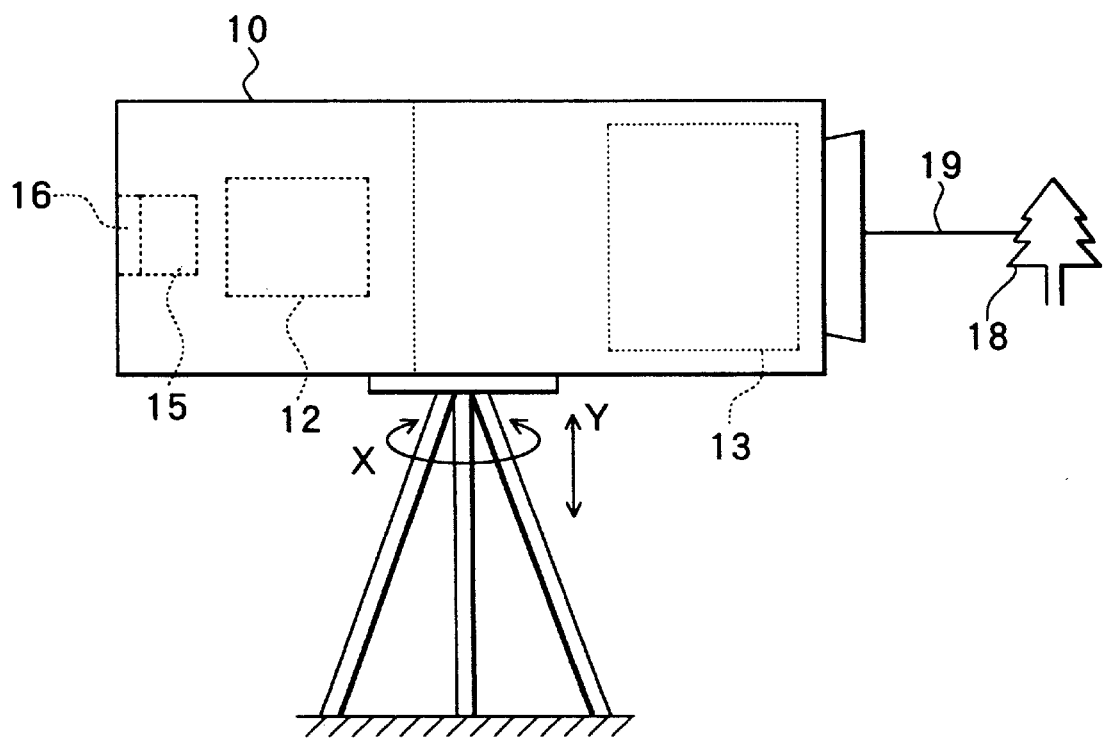
FIG. 3 is a side view of the video camera shown in FIG. 2.

Referring to FIG. 2 and FIG. 3, a schematic configuration of a video camera including an image vibration compensating apparatus of the embodiment will now be described. FIG. 2 is a schematic top view of the video camera. FIG. 3 is an external side view of the video camera. The video camera comprises a housing 10 which accommodates: an image pickup device 11 using a charge coupled device (CCD), for example; an optical image pickup system (not shown) for forming an image of a subject on the image pickup device 11; and a video amplifier 12 for processing signals outputted from the image pickup device 11 to convert to video signals. In the optical image pickup system a prism block 13 is provided for optically compensating image vibrations. The housing 10 further accommodates an X-direction gyro sensor 15 for detecting an angular velocity of the video camera in the lateral direction (referred to as the X direction in the following description) to detect a vibration of the video camera in the X direction and a Y-direction gyro sensor 16 for detecting an angular velocity of the video camera in the vertical direction (referred to as the Y direction in the following description) to detect a vibration of the video camera in the Y direction.

Figure 4:
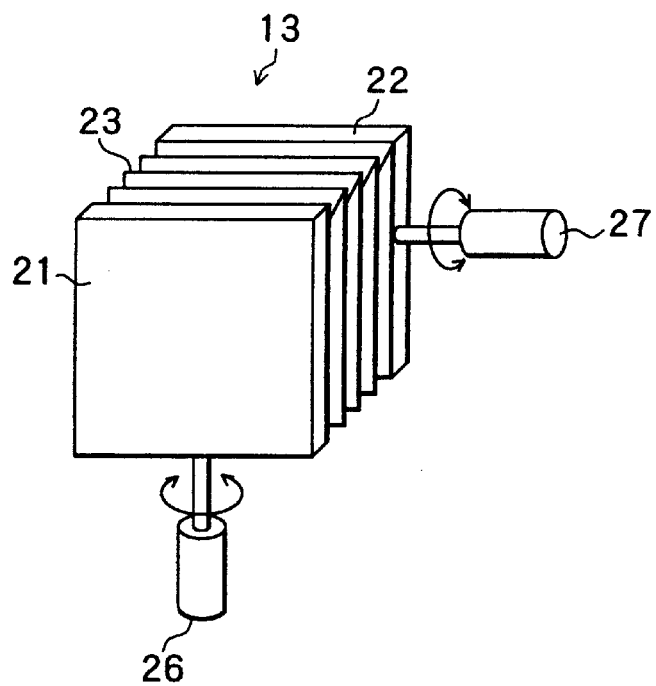
FIG. 4 is a perspective view for illustrating the prism block shown in FIG. 2.

FIG. 4 is a perspective view for illustrating the structure of the prism block 13. The prism block 13 comprises: a glass plate 21 for X-direction compensation and a glass plate 22 for Y-direction compensation, both transparent and having an equal refractive index and formed in a rectangle shape, for example; bellows 23 for flexibly connecting the glass plates 21 and 22 to be opposed to each other; liquid 25 (see FIG. 2) having a refractive index nearly equal to that of the glass plates 21 and 22 and filling the space surrounded by the glass plates 21 and 22 and the bellows 23; a motor 26 for X-direction compensation to turn the glass plate 21 in the X direction; and a motor 27 for Y-direction compensation to turn the glass plate 22 in the Y direction.

In the prism block 13 the glass plates 21 and 22, the bellows 23 and the liquid 25 form a prism whose apex angle is variable. When the glass plates 21 and 22 are placed parallel to each other, an optical axis 19 (see FIG. 2 and FIG. 3) reaching the image pickup device 11 from a subject 18 (see FIG. 3) is not deflected through the prism block 13. In contrast, when the glass plates 21 and 22 are not placed parallel to each other by turning the glass plate 21 with the motor 26, the optical axis 19 is deflected in the X direction through the prism block 13. When the glass plates 21 and 22 are not placed parallel to each other by turning the glass plate 22 with the motor 27, the optical axis 19 is deflected in the Y direction through the prism block 13. The angle and direction of deflection of the optical axis 19 depend on the angle and direction of turning of the glass plates 21 and 22.

Figure 5A:
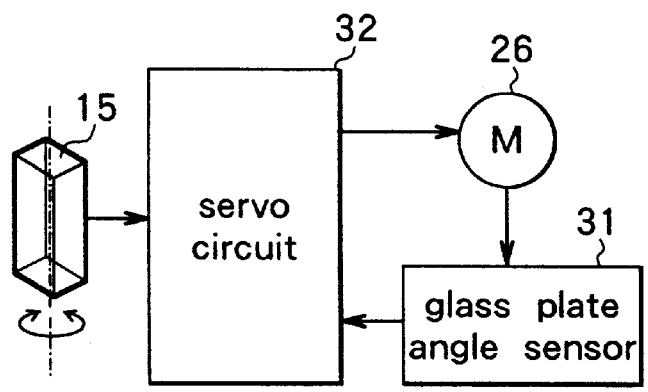
FIG. 5A and FIG. 5B are block diagrams for schematically illustrating a servo system of the image vibration compensating apparatus of the embodiment of the invention.
Figure 5B:
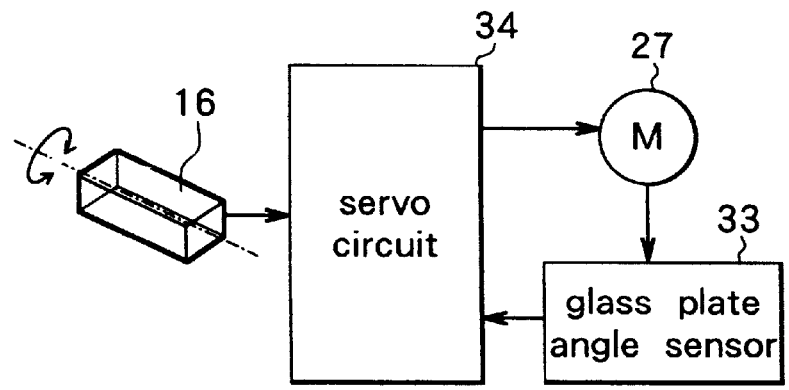

FIG. 5A and FIG. 5B are block diagrams for schematically illustrating a servo system of the image vibration compensating apparatus of the embodiment. As shown in FIG. 5A, the servo system comprises: a glass plate angle sensor 31 fixed to the motor 26 for determining the angle of the glass plate 21 by detecting a rotational position of the motor 26 and a servo circuit 32 for generating an angle control signal based on an output signal of the X-direction gyro sensor 15, comparing the angle control signal with an output signal of the glass plate angle sensor 31, generating an error signal of the glass plate angle corresponding to the difference in the comparison and driving the motor 26 based on the error signal. The angle control signal generated in the servo circuit 32 corresponds to the angle of rotation of the glass plate 21 for compensating an image vibration caused by the video camera shaken in the X direction.

As shown in FIG. 5B, the servo system further comprises: a glass plate angle sensor 33 fixed to the motor 27 for determining the angle of the glass plate 22 by detecting a rotational position of the motor 27 and a servo circuit 34 for generating an angle control signal based on an output signal of the Y-direction gyro sensor 16, comparing the angle control signal with an output signal of the glass plate angle sensor 33, generating an error signal of the glass plate angle corresponding to the difference in the comparison and driving the motor 27 based on the error signal. The angle control signal generated in the servo circuit 34 corresponds to the angle of rotation of the glass plate 22 for compensating an image vibration caused by the video camera shaken in the Y direction.

Figure 1:
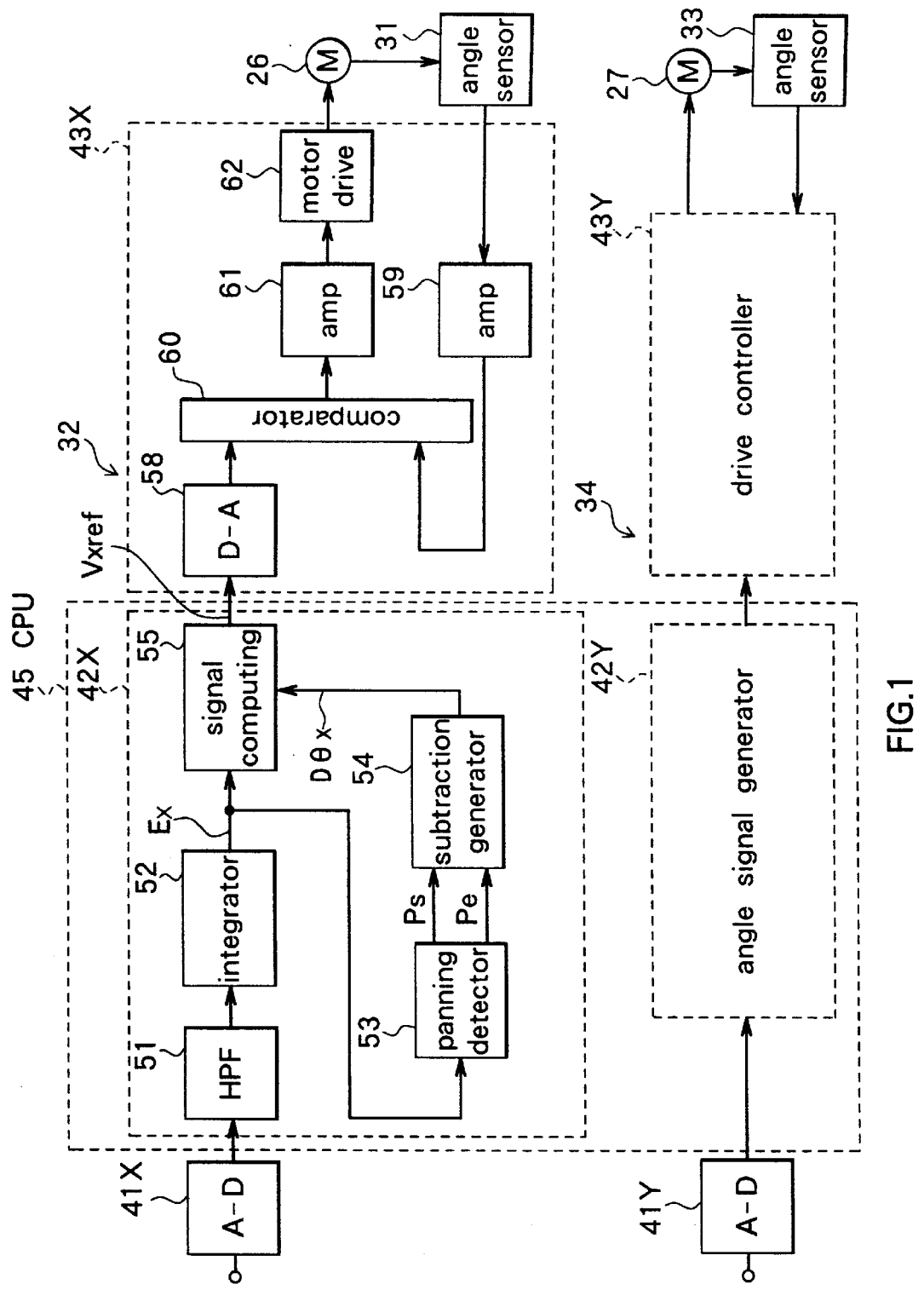
FIG. 1 is a block diagram of a servo circuit of an image vibration compensating apparatus of an embodiment of the invention.

FIG. 1 is a block diagram of the servo circuits of the image vibration compensating apparatus of the embodiment. The servo circuit 32 comprises: an analog-digital (A-D) converter 41X for performing A-D conversion of an output signal of the X-direction gyro sensor 15; an angle signal generator 42X for generating an angle control signal in the X direction based on the output signal of the A-D converter 41X; and a drive controller 43X for driving the motor 26 based on the angle control signal outputted from the angle signal generator 42X and the output signal of the glass plate angle sensor 31. The motor 26, the glass plate angle sensor 31 and the drive controller 43X correspond to compensation means of the invention.

Similarly, the servo circuit 34 comprises: an A-D converter 41Y for performing A-D conversion of an output signal of the Y-direction gyro sensor 16; an angle signal generator 42Y for generating an angle control signal in the Y direction based on the output signal of the A-D converter 41Y; and a drive controller 43Y for driving the motor 27 based on the angle control signal outputted from the angle signal generator 42Y and the output signal of the glass plate angle sensor 33. The motor 27, the glass plate angle sensor 33 and the drive controller 43Y correspond to the compensation means of the invention.

The angle signal generators 42X and 42Y are implemented through a shared central processing unit (CPU) 45, for example. Read only memory (ROM) and random access memory (RAM) are connected to the CPU 45. The CPU 45 implements the functions of the angle signal generators 42X and 42Y through executing a program stored in the ROM with the RAM as a work area.

The angle signal generator 42X and the drive controller 43X each have a configuration similar to that of the angle signal generator 42Y and the drive controller 43Y, respectively. Therefore the angle signal generator 42X and the drive controller 43X will be only described in detail. In the following description 'panning' may be replaced with 'tilting' and 'X direction' with 'Y direction' for the angle signal generator 42Y and the drive controller 43Y.

The angle signal generator 42X comprises: a high-pass filter (HPF) 51 for removing low frequency components from output signals of the A-D converter 41X so as to remove direct current drift components and so on of the X-direction gyro sensor 15; an integrator 52 for integrating an output signal of the HPF 51 and generating an angle signal Ex; a panning detector 53 for detecting a start or a stop of intentional panning based on the angle signal Ex outputted from the integrator 52 and outputting a panning start signal Ps or a panning stop signal Pe; a subtraction value generator 54 for producing the absolute value of a subtraction value to be described later in detail in accordance with the output signal of the panning detector 53; and an angle control signal computing section 55 for generating an X-direction angle control signal $V_{Xref}$ through a computation using angle signal Ex outputted from the integrator 52 and the absolute value of the subtraction value generated at the subtraction value generator 54. The X-direction gyro sensor 15, the A-D converter 41X, the HPF 51 and the integrator 52 correspond to vibration detection means of the invention. The panning detector 53 corresponds to panning and tilting detection means of the invention. The subtraction value generator 54 and the angle control signal computing section 55 correspond to computing means of the invention. The cutoff frequency of the HPF 51 is of the order of 0.1 Hz, for example.

The integrator 52 determines an upper limit value $+\theta x$ and a lower limit value $-\theta x$ for an amount of change of angle signal Ex. The integrator 52 outputs angle signal Ex within the range from the upper limit $+\theta x$ and the lower limit $-\theta x$. Therefore, when angle signal Ex reaches $+\theta x$ or $-\theta x$ with intentional panning, angle signal Ex is maintained at a value close to $+\theta x$ or $-\theta x$ until completion of the panning. After the completion of the intentional panning, the integrator 52 returns angle signal Ex maintained at the value close to $+\theta x$ or $-\theta x$ to zero (the state in which the optical axis is not deflected) with the time constant of the integrator 52. Therefore the amount of change of angle signal Ex to return to zero is $\pm\theta x|$ after the completion of the intentional panning. In the following description the amount of change of angle signal Ex after the completion of the intentional panning is termed the amount of return. The sign $\pm$ of $\theta x$ corresponds to the directions of panning.

The panning detector 53 does not detect a vibration in the panning direction as intentional panning while the absolute value Ex| of angle signal Ex is smaller than:$=\theta x$, that is, $$|Ex|<\pm\theta x|$$

is satisfied. The panning detector 53 detects the instant at which $$|Ex|=\pm\theta x|$$

is satisfied as a start of intentional panning and outputs panning start signal Ps to the subtraction value generator 54. Having outputted panning start signal Ps, the panning detector 53 detects the instant at which the absolute value |Ex of angle signal Ex is smaller than $|=\theta x$ by a specific set value $\alpha x$ (a positive value), that is, $$|Ex|\leq|=\theta x|-\alpha x$$

is satisfied as completion of the intentional panning and outputs panning stop signal Pe to the subtraction value generator 54. The set value $\alpha x$ is appropriately determined in accordance with the slope of change of the absolute value |Ex of angle signal Ex after the completion of the intentional panning so that completion of panning will not be wrongly detected in the course of the intentional panning while the completion of intentional panning will be immediately detected on its completion.

Before detailed description of the subtraction value generator 54 and the angle control signal computing section 55, the operation without the panning detector 53, the subtraction value generator 54 and the angle control signal computing section 55 will be briefly described. In this case angle signal Ex outputted from the integrator 52 is the signal corresponding to an angle of rotation of the glass plate 21 for compensating an image vibration due to a vibration of the video camera in the X direction. Therefore, if intentional panning is performed in this case, angle signal Ex is maintained at a value close to $\pm\theta x|$ in the course of the intentional panning. Consequently the angle signal changes by the amount of return $|\pm\theta x|$ after completion of the intentional panning. The angle of deflection of the optical axis thereby changes by $|=\theta x|$. As a result, the operator feels that it is unnatural.

The present embodiment therefore provides the subtraction value generator 54 and the angle control signal computing section 55 for canceling out angle signal Ex generated by intentional panning so that the angle of deflection of the optical axis will not change after completion of the intentional panning.

The subtraction value generator 54 will now be described in detail. The subtraction value generator 54 generates the absolute value D $\theta x$ of a subtraction value for canceling out angle signal Ex generated by intentional panning during a period from detection of the start of the intentional panning and detection of the stop of the intentional panning by the panning detector 53. This generation by the subtraction value generator 54 is performed in a period including at least the instant at which the intentional panning is stopped. The subtraction value generator 54 generates the absolute value D$\theta x$ of a subtraction value for canceling out angle signal Ex generated by the intentional panning in a specific period after the detection of the stop of the intentional panning by the panning detector 53. In the specific period the subtraction value generator 54 outputs the absolute value D$\theta x$ of the subtraction value to the angle control signal computing section 55. The absolute value D$\theta x$ outputted from the subtraction value generator 54 is subtracted from or added to angle signal Ex outputted from the integrator 52 at the angle control signal computing section 55.

Generation of the absolute value D$\theta x$ of the subtraction value at the subtraction value generator 54 will now be described. Receiving panning start signal Ps from the panning detector 53, the subtraction value generator 54 generates the absolute value D$\theta x$ of the subtraction value in a period until panning stop signal Pe from the panning detector 53 is received. The absolute value D$\theta x$ is initially zero and increases with time by the amount of increase '$n_1$' (a positive value) per unit time. The maximum value of the absolute value D$\theta x$ of the subtraction value is limited so as not to exceed the absolute value |Ex of angle signal Ex. This limitation may be performed either at the subtraction value generator 54 or the angle control signal computing section 55, using angle signal Ex outputted from the integrator 52. The amount of increase $n_1$ per unit time is appropriately determined with consideration of time required for typical panning. The amount of increase $n_1$ is determined so that the final absolute value D$\theta x$ will be a value ($=|Ex|$) for canceling angle signal Ex resulting from intentional panning (at least at completion of the panning).

Receiving panning stop signal Pe from the panning detector 53, the subtraction value generator 54 generates the absolute value D$\theta x$ of the subtraction value. The initial value of the absolute value DΘx is the value at the input of panning stop signal Pe. The absolute value DΘx decreases with time by the amount of decrease 'n$_2$' (a positive value) per unit time. The minimum value of the absolute value DΘx of the subtraction value is zero. The subtraction value generator 54 maintains the absolute value DΘx at zero after the absolute value DΘx reaches zero after receiving panning stop signal Pe. The amount of decrease n$_2$ per unit time is determined to correspond to the amount of change with time of angle signal Ex resulting from intentional panning and generated after the completion of the intentional panning.

The angle control signal computing section 55 will now be described in detail. The angle control signal computing section 55 performs the following computation in a period from the input of panning start signal Ps until the input of panning stop signal Pe and a period from the input of panning stop signal Pe until the absolute value DΘx of the subtraction value reaches zero. When angle signal Ex is a positive value, the absolute value DΘx of the subtraction value is subtracted from angle signal Ex at the angle control signal computing section 55 and the result is outputted as X-direction angle control signal $V_{Xref}$. When angle signal Ex is a negative value, the absolute value DΘx of the subtraction value is added to angle signal Ex at the angle control signal computing section 55 and the result is outputted as X-direction angle control signal $V_{Xref}$. Therefore, when angle signal Ex is a positive value, the value to be subtracted from angle signal Ex is DΘx. When angle signal Ex is a negative value, the value to be subtracted from angle signal Ex is (−DΘx). In a period other than those periods the angle control signal computing section 55 outputs angle signal Ex as X-direction angle control signal $V_{Xref}$.

The drive controller 43X comprises: a digital-analog (D-A) converter 58 for performing D-A conversion of X-direction angle control signal $V_{Xref}$ outputted from the angle control signal computing section 55; an amplifier 59 for amplifying an output signal of the glass plate angle sensor 31; a comparator circuit 60 for comparing the output signal of the D-A converter 58 with the output signal of the amplifier 59 and generating a signal corresponding to the difference therein; an amplifier 61 for amplifying the signal generated at the comparator circuit 60 and outputting an error signal of the glass plate angle; and a motor drive circuit 62 for driving the motor 26 based on the output signal of the amplifier 61.

The operation of the image vibration compensating apparatus of the embodiment will now be described. In the compensating apparatus the X-direction gyro sensor 15 detects the angular velocity of the video camera in the X direction. The glass plate angle sensor 31 detects the angle of the glass plate 21. The output signal of each of the X-direction gyro sensor 15 and the glass plate angle sensor 31 is inputted to the servo circuit 32. Similarly, the Y-direction gyro sensor 16 detects the angular velocity of the video camera in the Y direction. The glass plate angle sensor 33 detects the angle of the glass plate 22. The output signal of each of the Y-direction gyro sensor 16 and the glass plate angle sensor 33 is inputted to the servo circuit 34.

In the servo circuit 32, A-D conversion is performed on the output signal of the X-direction gyro sensor 15 at the A-D converter 41X and the signal is then inputted to the angle signal generator 42X. Similarly, in the servo circuit 34, A-D conversion is performed on the output signal of the Y-direction gyro sensor 16 at the A-D converter 41Y and the signal is then inputted to the angle signal generator 42Y.

Figure 6:
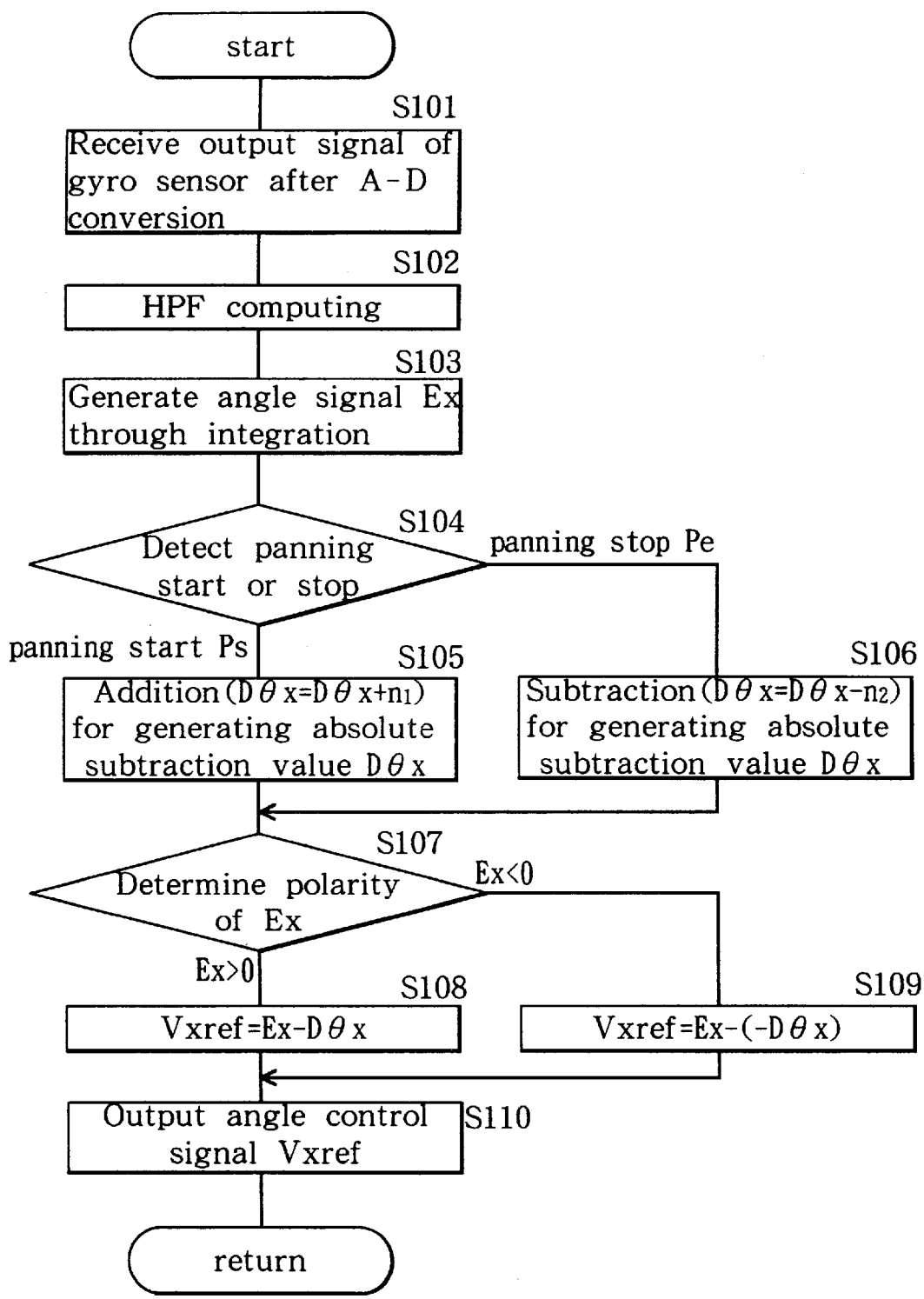
FIG. 6 is a flowchart of the operation of the CPU in FIG. 1.

Reference is now made to a flowchart in FIG. 6 for describing the operation of the CPU 45 relating to the function of the angle signal generator 42X. The operation is repeated in a given cycle in the main routine of the operation of the CPU 45. The CPU 45 first receives the output signal from the X-direction gyro sensor 15 after A-D conversion from the A-D converter 41X (step S101). The HPF 51 then performs HPF computation on the signal to remove low frequency components (step S102). The integrator 52 integrates the output signal of the HPF 51 for generating angle signal Ex (step S103).

Next, the CPU 45 detects a start or a stop of intentional panning at the panning detector 53 based on angle signal Ex outputted from the integrator 52 and outputs panning start signal Ps or panning stop signal Pe (step S104). If a start of intentional panning is detected, the panning detector 53 outputs panning start signal Ps to the subtraction value generator 54. In a period between receipt of panning start signal Ps and receipt of panning stop signal Pe, the subtraction value generator 54 performs an adding process (DΘx= DΘx+n$_1$) where the initial value of the absolute value DΘx of a subtraction value is zero and the amount of increase per unit time is n$_1$ (a positive value). The subtraction value generator 54 thus generates the absolute value DΘx of the subtraction value increasing with time (step S105). The absolute value DΘx of the subtraction value is sent to the angle control signal computing section 55. The angle control signal computing section 55 determines the polarity (±) of angle signal Ex (step S107). If angle signal Ex is a positive value (Ex>0), the computing section 55 subtracts the absolute value DΘx from angle signal Ex (Ex−DΘx) and outputs the result as X-direction angle control signal $V_{Xref}$ (step S108). If angle signal Ex is a negative value (Ex<0), the computing section 55 adds the absolute value DΘx to angle signal Ex, that is, subtracts the subtraction value (−DΘx) from angle signal Ex (Ex−(−DΘx)) and outputs the result as X-direction angle control signal $V_{Xref}$ (step S109). The computing section 55 outputs angle control signal $V_{Xref}$ obtained in step S108 or S109 to the drive controller 43X (step S110). The operation of the CPU 45 then returns to the main routine.

If a stop of intentional panning is detected in step S104, the panning detector 53 outputs panning stop signal Pe to the subtraction value generator 54. In a period between receipt of panning stop signal Pe and receipt of the next panning start signal Ps, the subtraction value generator 54 performs a subtraction process (DΘx=DΘx−n$_2$) where the initial value is the value of DΘx at the input of panning stop signal Pe and the amount of decrease per unit time is n$_2$ (a negative value). The subtraction value generator 54 thus generates the absolute value DΘx of the subtraction value decreasing with time (step S106). As described above, the minimum value of the absolute value DΘx of the subtraction value is zero. Having reached zero, the absolute value DΘx is maintained at zero. The absolute value DΘx of the subtraction value is sent to the angle control signal computing section 55. The angle control signal computing section 55 determines the polarity (±) of angle signal Ex (step S107). If angle signal Ex is a positive value (Ex>0), the computing section 55 subtracts the absolute value DΘx from angle signal Ex (Ex−DΘx) and outputs the result as X-direction angle control signal $V_{Xref}$ (step S108). If angle signal Ex is a negative value (Ex<0), the computing section 55 adds the absolute value DΘx to angle signal Ex, that is, subtracts the subtraction value (−DΘx) from angle signal Ex (Ex−(−DΘx)) and outputs the result as X-direction angle control signal $V_{Xref}$ (step S109). The computing section 55 outputs angle control signal $V_{Xref}$ obtained in step S108 or S109 to the drive controller 43X (step S110). The operation of the CPU 45 then returns to the main routine.

In step S106 the absolute value Dθx of the subtraction value is maintained at zero in a period between the instant when the absolute value Dθx becomes zero and the instant when the next panning start signal Ps is received. Therefore the computing section 54 outputs angle signal Ex outputted from the integrator 52 as it is as X-direction angle control signal $V_{Xref}$ (step S110).

The CPU 45 performs an operation similar to that relating to the function of the X-direction angle signal generator 42X in FIG. 6 for the function of the Y-direction angle signal generator 42Y. The operation relating to the functions of the angle signal generators 42X and 42Y is repeated by an interrupt periodically generated.

X-direction angle control signal $V_{Xref}$ outputted from the angle signal generator 42X (the CPU 45) is inputted to the drive controller 43X. In the drive controller 43X, D-A conversion is performed on angle control signal $V_{Xref}$ at the D-A converter 58. The output signal of the glass plate angle sensor 31 is amplified at the amplifier 59. The output signal of the D-A converter 58 and the output signal of the amplifier 59 are compared to each other at the comparator circuit 60 to output a signal corresponding to the difference therein. The signal is then amplified at the amplifier 61 and the amplified signal is given to the motor drive circuit 62 as an error signal of the glass plate angle. The motor drive circuit 62 drives the motor 26 in accordance with the error signal. In this way the glass plate 21 is turned in response to the vibration of the video camera in the X-direction. An image vibration in the X direction is thus compensated so that the optical axis 19 reaching the image pickup device 11 from the subject 18 is fixed to the subject 18.

Similarly, the Y-direction angle control signal outputted from the angle signal generator 42Y (the CPU 45) is inputted to the drive controller 43Y. The motor 27 is driven by the drive controller 43Y based on the angle control signal and the output signal of the glass plate angle sensor 33. The glass plate 22 is thereby turned in response to the vibration of the video camera in the Y-direction. An image vibration in the Y direction is thus compensated.

Figure 7:
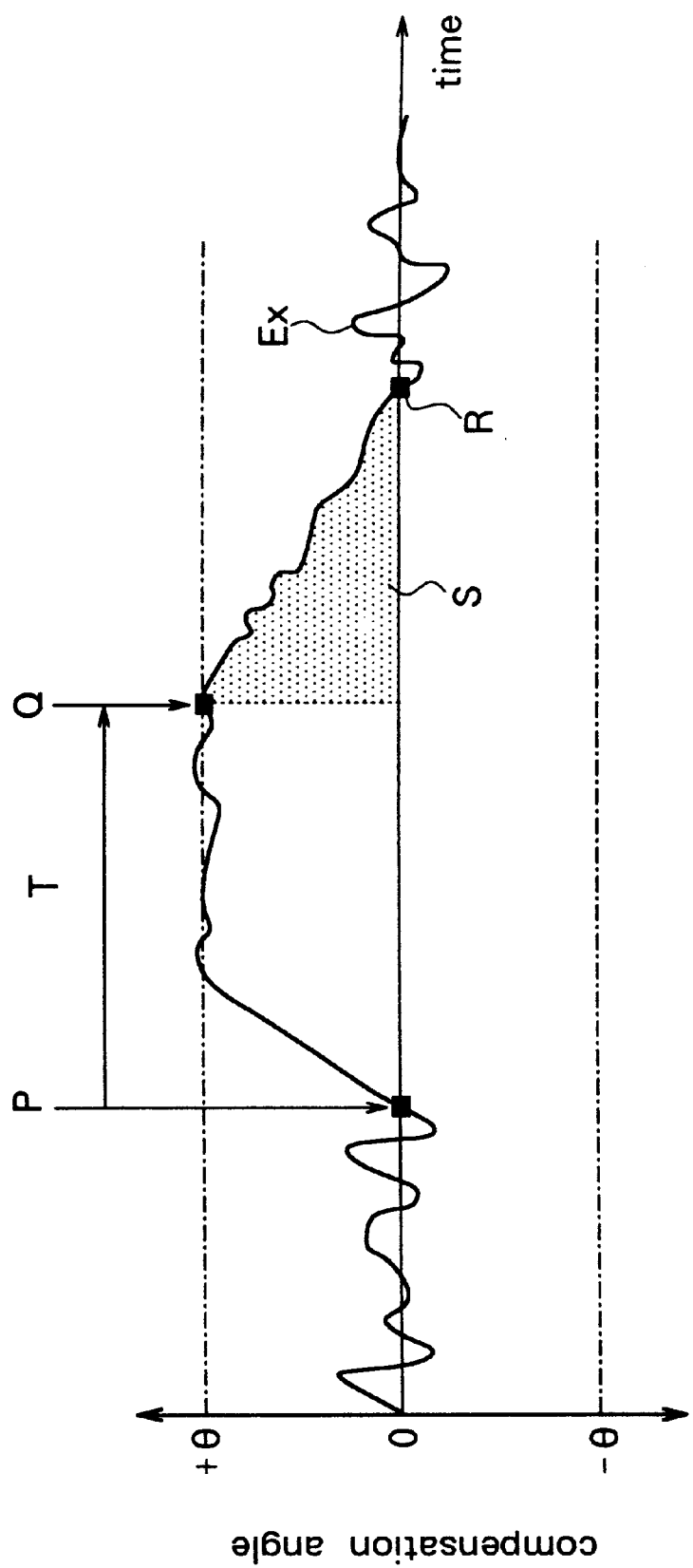
FIG. 7 is a plot for illustrating an example of temporal changes of a compensation angle of an optical axis when intentional panning is performed without the panning detector, subtraction value generator and X-direction angle control signal computing section in FIG. 1 for comparison with the image vibration compensating apparatus of the embodiment of the invention.

Referring to FIG. 7 and FIG. 8, generation of an angle control signal in the image vibration compensating apparatus of the embodiment will now be specifically described. FIG. 7 illustrates an example of temporal changes of a compensation angle of an optical axis when intentional panning is performed without the panning detector 53, subtraction value generator 54 and X-direction angle control signal computing section 55 in FIG. 1 for comparison with the image vibration compensating apparatus of the embodiment. In this case the value of angle signal Ex outputted from the integrator 52 in FIG. 1 corresponds to the compensation angle of the optical axis. In FIG. 7 time P is the time when intentional panning is started and time Q is the time when intentional panning is stopped. The time between time P and time Q is panning time T. In the example shown in FIG. 7 the compensation angle is fixed to the upper limit +θx of angle signal Ex (or the lower limit -θx) in a short time after the start of intentional panning. The compensation angle is reduced with the time constant of the integrator 52 after the intentional panning is stopped. At time R the compensation angle returns to the proximity of the center of the compensation range (+θx to -θx). Therefore unnatural image vibrations are produced in region S where the compensation angle has certain values from time Q to time R. The operator thus has a feeling of unnaturalness.

FIG. 8A illustrates an example of temporal changes of angle signal Ex outputted from the integrator 52 when panning similar to that shown in FIG. 7 is performed in the image vibration compensating apparatus of the embodiment. The temporal changes of angle signal Ex are similar to the temporal changes of the compensation angle of the optical axis shown in FIG. 7. FIG. 8B illustrates an example of temporal changes of the absolute value Dθx of a subtraction value generated at the subtraction value generator 54 with the same timing as FIG. 8A in the image vibration compensating apparatus of the embodiment. FIG. 8C illustrates an example of temporal changes of X-direction angle control signal $V_{Xref}$ outputted from the computing section 55 with the same timing as FIG. 8A and FIG. 8B in the image vibration compensating apparatus of the embodiment. In the figures time P is the time when intentional panning is started and time Q is the time when intentional panning is stopped. The time between time P and time Q is panning time T. Time $W_1$ is the time when the panning detector 53 detects the start of the intentional panning. Time $W_2$ is the time when the panning detector 53 detects the stop of the intentional panning.

In the embodiment, if a start of panning is detected at the panning detector 53 at time $W_1$, the absolute value Dθx of a subtraction value increasing with time is generated at the subtraction value generator 54, as shown in FIG. 8B, until a stop of panning is detected at time $W_2$. The absolute value Dθx of a subtraction value is the value of ±θx| for canceling out angle signal Ex resulting from intentional panning in period $T_1$ including at least the time when panning is stopped. After the stop of panning is detected at the panning detector 53 at time $W_2$, the absolute value Dθx of a subtraction value decreasing with time is generated at the subtraction value generator 54, as shown in FIG. 8B. The absolute value Dθx of a subtraction value after the stop of panning is the value for canceling out angle signal Ex resulting from intentional panning. The absolute value Dθx is zero at time R and maintained at zero until the panning detector 53 detects a start of panning.

The absolute value Dθx of a subtraction value is sent to the angle control signal computing section 55. The computing section 55 determines the polarity of angle signal Ex. If angle signal Ex is a positive value, the computing section 55 subtracts the absolute value Dθx from angle signal Ex and outputs the result as X-direction angle control signal $V_{Xref}$. If angle signal Ex is a negative value, the computing section 55 adds the absolute value Dθx to angle signal Ex, that is, subtracts the subtraction value (-Dθx) from angle signal Ex and outputs the result as X-direction angle control signal $V_{Xref}$. The computing section 55 outputs angle signal Ex as it is as angle control signal $V_{Xref}$ in a period between time R when the absolute value Dθx becomes zero and the instant when a start of next panning is detected at the panning detector 53. The motor 26 is driven by the drive controller 43X based on angle control signal $V_{Xref}$ generated as thus described.

Consequently, as shown in FIG. 8C, angle control signal $V_{Xref}$ reaches the upper limit +θx (or the lower limit -θx) in a short time after the start of intentional panning at time P. Angle control signal $V_{Xref}$ gradually approaches zero after detection of the start of panning at time $W_1$ and a subtraction value is started to be subtracted from angle signal Ex. In period $T_1$ at least including the time when panning is stopped, angle signal Ex resulting from intentional panning is cancelled out by the subtraction value to become nearly zero. This means that the angle of deflection of the optical axis is nearly zero at least when panning is stopped. If this state is maintained after the stop of panning, an unnatural image vibration will not be produced after the stop of panning.

As shown in FIG. 8A, angle signal Ex gradually approaches zero with the time constant of the integrator 52 after intentional panning is stopped at time Q. Therefore, if a subtraction value is held constant after panning is stopped, angle control signal $V_{Xref}$ gradually leaves zero and an unnatural image vibration results. In the embodiment, as shown in FIG. 8B, the absolute value D$\theta$x of a subtraction value is gradually reduced and the subtraction value is subtracted from angle signal Ex after detection of the stop of panning at time W$_2$. Angle signal Ex resulting from intentional panning is thus cancelled out by the subtraction value. As a result, after panning is stopped, as shown in FIG. 8C, the angle of deflection of the optical axis is maintained at nearly zero and an unnatural image vibration is not produced. Changes of the absolute value D$\theta$x of a subtraction value after intentional panning is stopped correspond to temporal changes of the absolute value of angle signal Ex generated after intentional panning is stopped. That is, the slope of the changes of the absolute value D$\theta$x is nearly equal to the slope of the changes of the absolute value of angle signal Ex generated after intentional panning is stopped.

The image vibration compensating apparatus of the embodiment thus suppresses unnatural image vibrations after completion of intentional panning. This applies to intentional tilting as well although description thereof is omitted.

As described so far, the image vibration compensating apparatus of the embodiment allows angle signals resulting from intentional panning or tilting to be canceled so that the angle of deflection of the optical axis will not change after completion of intentional panning or tilting. As a result, unnatural image vibrations after completion of intentional panning or tilting are suppressed. Unnaturalness felt by the operator is thus reduced.

After intentional panning or tilting is completed, the image vibration compensating apparatus of the embodiment allows a subtraction value to change with temporal changes of an angle signal after completion of intentional panning or tilting. As a result, angle signals resulting from intentional panning or tilting and generated after completion of intentional panning or tilting are properly canceled out. Unnatural image vibrations after completion of intentional panning or tilting are thus prevented.

When a start of intentional panning or tilting is detected, the image vibration compensating apparatus of the embodiment allows a subtraction value to gradually change from zero so as to be finally a value for canceling an angle signal resulting from intentional panning or tilting (at least on completion of intentional panning or tilting). As a result, abrupt image vibrations due to abrupt changes of the angle of deflection of the optical axis are prevented during panning or tilting. Unnaturalness felt by the operator during panning or tilting is thus reduced.

The present invention is not limited to the embodiment described so far but may be practiced in still other ways. In the foregoing embodiment, for example, the prism block 13 using the prism with the variable apex angle is used for the mechanism for compensating image vibrations. Alternatively, an optical compensation system allowing the optical axis to be deflected by shifting a lens in the direction perpendicular to the optical axis may be used. For the vibration detection means an acceleration sensor may be used instead of the angle velocity sensor.

The image vibration compensating apparatus of the invention may be incorporated in a video camera and so on. Alternatively, the apparatus may be in the form of an adapter detachably inserted to a video camera and so on. Furthermore, the invention is applicable to any other image pickup apparatus such as a still-video camera and a movie camera using a film for a movie.

In the image vibration compensating apparatus of the invention described so far the vibration detection means detects the vibration causing the image vibration and outputs the signal in response to the vibration. The panning and tilting detection means detects the start and stop of the intentional panning. During the period between detection of the start of the intentional panning or tilting and detection of the stop of the intentional panning or tilting by the panning and tilting detection means, the computing means subtracts the value for canceling the output signal of the vibration detection means resulting from the intentional panning or tilting from the output signal of the vibration detection means in the period at least including the instant of the stop of the intentional panning or tilting. The computing means subtracts the value for canceling the output signal of the vibration detection means from the output signal of the vibration detection means in the period after the detection of the stop of the intentional panning or tilting by the panning and tilting detection means. The computing means outputs the output signal of the vibration detection means intact in any other period. The compensation means compensates the image vibration based on the output signal of the computing means. As a result, unnatural image vibrations after completion of intentional panning and tilting are suppressed and image vibrations are properly compensated.

In the image vibration compensating apparatus of the invention the computing means may further change the value subtracted from the output signal of the vibration detection means with time in the period after the detection of the stop of the intentional panning or tilting by the panning and tilting detection means so that the value corresponds to the temporal change of the output signal of the vibration detection means generated after the stop of the intentional panning or tilting. As a result, angle signals resulting from intentional panning or tilting and generated after completion of intentional panning or tilting are properly canceled out. Unnatural image vibrations after completion of intentional panning or tilting are thus prevented.

In the image vibration compensating apparatus of the invention the computing means further subtracts a value from the output signal of the vibration detection means during the period between detection of the start of the intentional panning or tilting and detection of the stop of the intentional panning or tilting by the panning and tilting detection means. The value subtracted changes with time to be finally a value for canceling the output signal of the vibration detection means resulting from the intentional panning or tilting. As a result, abrupt image vibrations are prevented during panning and tilting. Unnaturalness felt by the operator during panning and tilting is thus reduced.

Obviously many modifications and variations of the present invention are possible in the light of the above teachings. It is therefore to be understood that within the scope of the appended claims the invention may be practiced otherwise than as specifically described.

What is claimed is:

1. An image vibration compensating apparatus comprising:

a vibration detection means for detecting a vibration causing an image vibration and outputting an signal in accordance with the vibration;

a panning and tilting detection means for detecting a start and a stop of intentional panning or tilting;

a computing means for subtracting a value for canceling the output signal of said vibration detection means resulting from the intentional panning or tilting from the output signal of said vibration detection means during a period between detection of the start of the intentional panning or tilting and detection of the stop of the intentional panning or tilting by said panning and tilting detection means in a period at least including the instant of the stop of the intentional panning or tilting, for subtracting a value for canceling the output signal of said vibration detection means from the output signal of said vibration detection means in a period after the detection of the stop of the intentional panning or tilting by said panning and tilting detection means and for outputting the output signal of said vibration detection means intact in any other period; and a compensation means for compensating the image vibration based on the output signal of said computing means.

2. An image vibration compensating apparatus according to claim 1 wherein said computing means changes the value subtracted from the output signal of said vibration detection means with time in the period after the detection of the stop of the intentional panning or tilting by said panning and tilting detection means so that the value corresponds to a temporal change of the output signal of said vibration detection means generated after the stop of the intentional panning or tilting.

3. An image vibration compensating apparatus according to claim 1 wherein said computing means subtracts the value from the output signal of said vibration detection means during the period between detection of the start of the intentional panning or tilting and detection of the stop of the intentional panning or tilting by said panning and tilting detection means, the value changing with time to finally become a value sufficient to cancel the output signal of said vibration detection means resulting from the intentional panning or tilting.

* * * * *